June 13, 1950     G. B. SCHEER     2,511,446
CONTROL FOR AIRCRAFT
Filed June 12, 1945     2 Sheets-Sheet 1
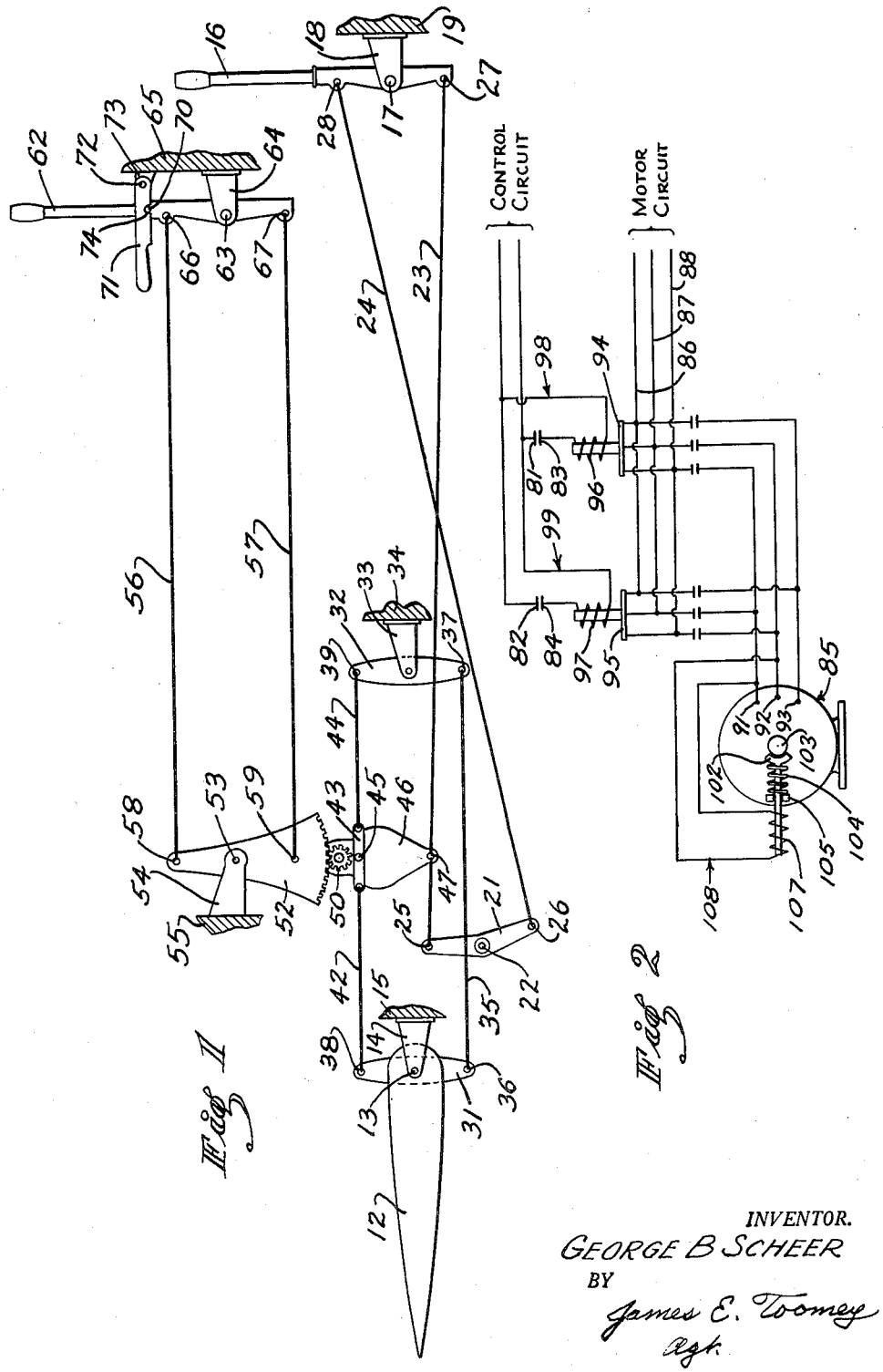
INVENTOR.
GEORGE B SCHEER
BY James E. Toomey
Agt.

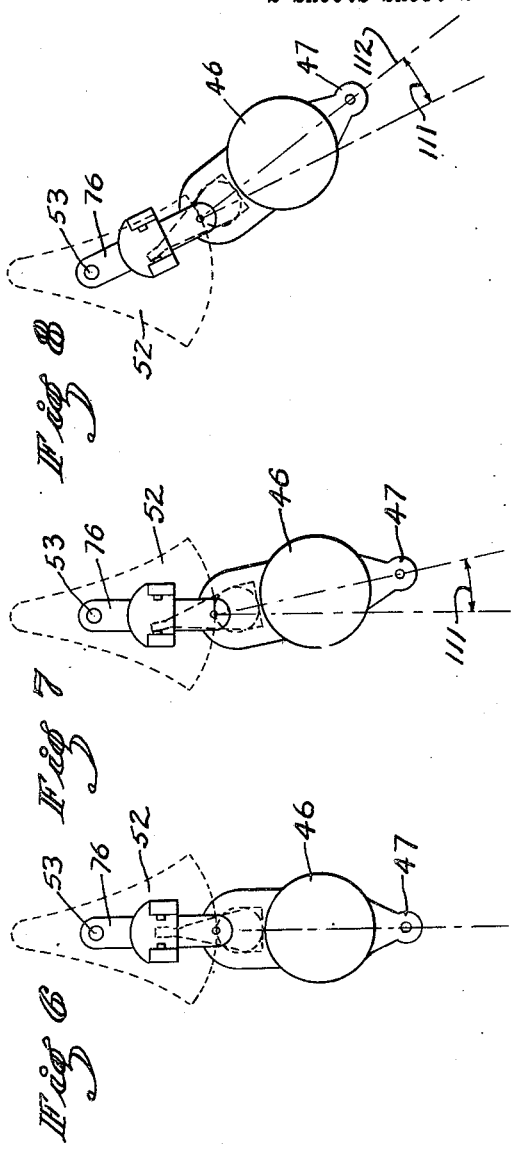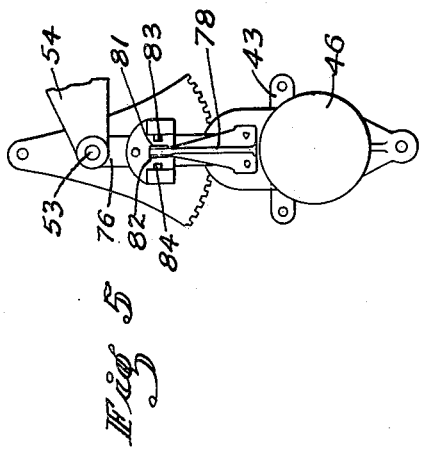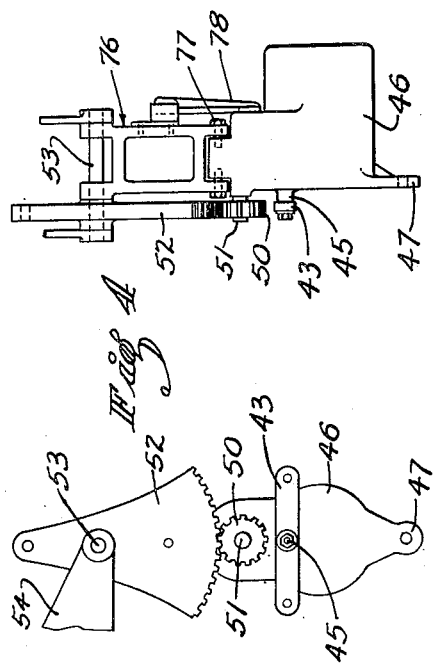

Patented June 13, 1950

2,511,446

UNITED STATES PATENT OFFICE 2,511,446

CONTROL FOR AIRCRAFT

George B. Scheer, Berkeley, Calif., assignor to Henry J. Kaiser Company, Oakland, Calif., a corporation of Nevada Application June 12, 1945, Serial No. 599,053

16 Claims. (Cl. 244—83)

This invention relates to the controls for steering or deflecting an aircraft on its course of flight, no matter whether the deflection desired be laterally or vertically, and it is also useful on other than aircraft.

Airplanes have vertical rudder surfaces for horizontal steering and similar horizontal surfaces for vertical deflection of the course of the plane as well as ailerons, and each is ordinarily controlled by separate actions of the pilot with respect to the control means which he grasps. Every pilot likes to have the "feel" of the plane which he is piloting since he relies thereon much of the time for an exact knowledge of the controlling effect of the particular control member deflected, and this is particularly true under conditions of flying blind. The feel or feel back from the particular control member deflected contributes greatly to skillful flying in any maneuver. Control sticks or other devices which the pilot grasps have been connected to the various deflectable control surfaces to deflect them from their normal positions to bring about the desired change, such deflection requiring muscular effort by the pilot due to the effect of the airstream or wind on the deflected surface. Such muscular effort is normally an increasing function of the degree of deflection at a given speed and of course increases also with the speed.

The muscular effort required in airplanes up to a certain weight has not been beyond the ability of the pilot nor so great as to prevent him from properly performing the many functions and observing the many instruments required in piloting. But with the extremely heavy planes recently developed the muscular effort required is so great as to prevent the pilot from exercising his best skill.

The use of servo means has been proposed to decrease the physical effort required of the pilot. Some of the proposed devices include a multiplicity of complicated cable linkages, and the possibility of failure of the servo system increases with each cable and pulley used, and failure may mean disaster. Hydraulic means have also been proposed, but a serious weakness of hydraulic systems lies in the fact that rupture in any part of the system causes loss of pressure and control of the surfaces becomes impossible, resulting in disaster.

Some of the proposed devices are not intended to and do not afford the required "feel back" of the wind force on the deflected surface or surfaces. Other proposed devices are intended to offer resistance to the movement of the control stick which the pilot feels but such resistance is not in a fixed proportion to, nor a true measure or indication of, the wind force on the deflected control surface. It may be merely the force of springs interposed in cables connecting the control stick and the deflectable surface, the springs normally maintaining a switch contact between oppositely disposed contacts, the intermediate contact being movable to either outside contact to cause operation of the servomotor in the respective direction and thereby deflect the control surface as desired. Some proposed devices include an aileron-like control tab in the nature of a servo tab hinged to the control surface with the control cables including springs and being attached to the control tab and not to the control surface proper. Any resistance to the movement of the control stick is due to the springs or to the control tab. Any resistance due to the springs is, of course, not a true measure of the wind effect on the deflectable control surface. Any resistance due to the wind effect on the control tab is not always in a fixed proportion to, nor a true measure or indication of, the wind effect on the control surface, since the control surface is hinged at one end thereof to the craft and the control tab is hinged to the other end of the control surface.

Objects of this invention are to provide for the insufficiencies of the prior art; to provide a control which includes a servo means and affords a feel back which is always an increasing function of the turning movement exerted by the wind on the deflected control surface; to provide such a control in which the feel back is always proportional to such moment; to provide such a control in which the feel back is a predetermined percentage of the feel back if the servo means were absent; to provide such proportionate feel back and at the same time provide a servo means to move the control surface; to provide a control including the servo means if it became inoperative whereby disaster can be avoided; to provide such a control which permits automatic return of the deflected surface and of the member controlling it to their neutral position of zero deflection when the pilot releases the controlling member; to provide a single control means for effecting these objects and other objects will be apparent after reading this specification in connection with the accompanying drawings which illustrate a preferred embodiment of this invention.

On such drawings,

Fig. 1 is a diagrammatic view of the invention applied to a deflectable control surface, Fig. 2 is a diagram of the electrical circuits, Fig. 3 is a front elevation of actuating means controlled by the pilot's stick, Fig. 4 is a right side elevation of Fig. 3, Fig. 5 is a rear elevation thereof, and Figs. 6, 7 and 8 are diagrammatic rear elevations thereof showing the relation of the various parts at different stages of operation.

A conventional deflectable surface 12 for controlling the plane, which may be a rudder, elevator, aileron, or in fact any deflectable control surface, is pivotally mounted at 13 on a bracket 14 fixed to any suitable support 15. The surface 12 has conventionally been controllably deflected by a control stick 16 which may be pivotally mounted at 17 on a bracket 18 which is mounted on a suitable support 19. Such conventional stick or any other suitable controlling means may be used in this invention for operation by the pilot to move the surface 12.

A lever arm or bell crank 21 is pivotally mounted intermediate its ends at 22 on a fixed support (not shown), and flexible cables 23 and 24 are attached to the arm 21 at opposite sides of its pivot 22, as at 25 and 26, and to the stick 16 at opposite sides of its pivot 17 as at 27 and 28, respectively. The cables 23 and 24 may cross each other as seen on Fig. 1, or they may not be so crossed, depending on which direction of motion of the stick 16 is desired to swing the surface 12 upwardly or downwardly, or to the right or left, as the case may be. Instead of the combination of cables 23 and 24 a single rigid control rod may be used. In fact rigid control rods of the so called "push-pull" type, which are commonly used in aeronautic practice, may be substituted for other cable combinations which are disclosed herein for the purpose of illustrating the invention. A bell crank 31 is mounted intermediate its ends to pivot with the surface 12 to control the pivotal movement thereof. Another bell crank 32 is pivotally mounted intermediate its ends on a bracket 33 on a fixed support 34. The bell cranks 31 and 32 are connected together by a flexible cable 35 attached at 36 and 37 respectively, and they are also connected together at 38 and 39 respectively by a flexible cable. The cable 35, includes part of the servo means which moves the deflectable control surface in the desired direction. For example, a flexible cable 42 may be attached to the bell crank 31 at the point 38 and to one end of a link 43, the other end of which is attached by a flexible cable 44 to the point 39 of the bell crank 32. The link 43 is pivotally mounted on a pin 45 on the motor casing 46. One of the cables 23 or 24, is connected to the motor casing 46, preferably attached to a lug 47 on such casing.

It will now be apparent that movement of the stick 16 will cause pivotal movement of the control surface 12 as well as movement of the motor casing which acts as a primary lever. For example, with the specific connections shown on Fig. 1, when the pilot moves the stick 16 rearwardly, that is, to the left as seen on Fig. 1, there will result a pull on the cable 23 which moves the motor casing forwardly, which in turn causes a pull on the cable 42 which causes the surface 12 to tilt upwardly, all as seen on Fig. 1; the reverse movements occur when the stick is moved to the right; and, in whichever direction the stick is moved, the degree of movement of the motor casing and of the control surface 12 will depend on the degree of movement of the stick.

Such movement of the motor casing is used to set into operation the servo device to supply power to aid the pilot in moving the stick and the control surface, it being preferred that this begin when the stick and motor casing have each moved a slight amount.

An electric motor of the conventional aircraft type is within the motor casing 46. The main shaft of such motor is equipped with a gear (not shown) which drives a pinion 50 which meshes with the teeth of a gear segment 52. This gear segment is pivotally mounted on a shaft 53 supported by a bracket 54 immovably mounted on a fixed member 55. Such pivotal mounting is not used except under abnormal conditions of plane operation as will be hereinafter referred to, and under normal operating conditions the gear segment is held immovable, as for example by the cables 56 and 57 attached to the gear segment at 58 and 59 respectively, on different sides of its pivotal mounting 53. An auxiliary control stick 62 is pivotally mounted at 63 on a bracket 64 mounted on a fixed member 65. The cables 56 and 57 are attached to the stick at 66 and 67 respectively at different sides of the pivot 63. Means are provided to hold the auxiliary stick immovable during normal operation, as a result of which the cables 56 and 57, and consequently the gear segment 52, remain immovable as long as the auxiliary stick remains so. Such means preferably is of the latch type to permit of quick release in an emergency for a purpose which will be explained hereinafter. The securing means may comprise a latch pin 70 mounted on the stick 62, and a latch lever 71 pivotally mounted at 72 on a fixed bracket 73, and having a slot 74 to fit over the pin 70.

A supporting arm or frame 76 (see Figs. 4 and 5) is pivotally mounted at its upper end on the shaft 53, the motor casing 46 being pivotally mounted on, and supported by, the lower end of such frame in any suitable manner, for example by means of bolts or pins 77. Fixedly attached to the motor casing is an arm 78 having electrically connected electrical contacts 81 and 82. These contacts normally lie between and out of contact with corresponding contacts 83 and 84 fixed on the frame 76. Either the switch comprising the contacts 81 and 83, or the switch comprising the contacts 82 and 84, is closed when the motor swings about the pivot axis 77, depending on the direction of swing, to close either one of two control circuits which determine the direction of revolution of the motor. Alternatively the members 81 and 82 may be micro switches adapted to be operated by simple mechanical engagement of the arm 78 and eliminating the electric contact members 81 and 82.

The motor 85 is preferably of the three phase type, although any other suitable type may be used. Fig. 2 illustrates the electric circuit for use with a three phase motor and power line, the principles of which may be applied to any circuit suitable for use with any desired type of motor used. The leads 86, 87 and 88 from the source of power are connected to the motor terminals 91, 92 and 93 to cause the motor to revolve selectively in the desired direction. By means of a three pole switch 94 having a spring (not shown) or other means to hold it open normally, the leads 86, 87 and 88 are electrically connected to the motor terminals 93, 92 and 91, respectively, when the switch 94 is closed, and disconnected therefrom when the switch is in normal open position. Similarly, by means of a three pole switch 95, also held open normally by similar means, the leads 86, 87 and 88 are electrically connected to the motor terminals 93, 91 and 92 respectively when this switch is closed and disconnected therefrom when the switch is open. By such reversal of connections, closing of either of the switches 94 or 95 will cause power to be applied to the motor to cause it to revolve in one direction, while closing of the other switch will cause the power to be applied to the motor to cause it to revolve in the other direction. It is to be understood that switches 94 and 95 can be either electrically and/or mechanically interlocked.

Selective closing of the switches 94 and 95 is caused by independent solenoids, a solenoid 96 for the switch 94, and a solenoid 97 for the switch 95. These solenoids are in separate parallel two wire circuits 98 and 99 branching from a control circuit which may be fed from any two wires of the three wire motor circuit. The switch having the contacts 81 and 83 is in the solenoid circuit 98, and the switch having the contacts 82 and 84 is in the solenoid circuit 99. A brake shoe 102 is normally pressed against the motor shaft 103 by a spring 104 pressing against the brake shoe and a fixed abutment 105. A solenoid 107, when energized, causes the brake shoe to be retracted from the motor shaft. The solenoid 107 is actuated to release the motor brake only when the motor is energized, and is supplied with current by a circuit 108 including any two of the motor terminals.

The whole operation of the various parts is controlled by the stick 16. When the stick is in its normal, neutral, or inoperative position, the switches comprising the contacts 81 and 83, and 82 and 84, will be open because the arm or frame 76 and the motor casing are in line, thus positioning the contacts carried by the arm 78 midway between and away from the contacts 83 and 84. The switches 94 and 95 are both open as a result, and there is no current supplied to the motor nor to the brake-release solenoid 107. The motor is thus in what can be termed a "locked" condition and the pinion 50 cannot revolve about its own axis 51; and its only possible motion under such conditions is to effect a small rotation of the motor casing about the pivotal support afforded by the pins 77.

If the pilot tilts the stick, for example forwardly, that is, to the right as seen on Fig. 1, a rearward pull is exerted by the cable 23 on the lug 47 and the motor casing 46. The motor cannot pivot about the axis 53 since this would require rotation of the pinion 50 about its own axis. The motor, with the pinion 50 locked in fixed relation to it, can however pivot about the bolts 77 to cause it to swing rearwardly from the position shown on Fig. 6 to that shown on Fig. 7, the angle of swing, which is illustrated at 111 on the drawings is exaggerated for purposes of illustration, but is actually very small. The ideal pivot point of the motor about the pin 77 should be coincidental with the center line of the sprocket 50. It is however shown at a different position because of preferred structural features, but as the angle of rotation about the pin is very slight no mechanical problems are involved as the shortening of the distance between the center line of 50 and 53 is negligible.

A rearward pull on the lug 47 effects a forward pull on the cable or rod 35, which tilts the control surface 12 downwardly about its pivot 13. The pivotal movements of the motor about the axis 77 and that of the surface 12 about the axis 13 begin about the same time and continue together until the arm 78 tilts out of its normal position to cause the contact 82 to touch the contact 84, the position being as illustrated in Fig. 7. Until such contact is made, the pilot's muscular effort supplies all of the power required to offset and overcome the actual hinge moment due to the wind effect on the deflected surface 12, but such muscular effort is small because of the beneficial leverage ratio afforded him, namely, the ratio of the distance from the axis of attachment of the cables at 47 to the centerline of the pins or bolts at 77, as compared to the distance from the centerline of the pin 45 to the centerline of the pins or bolts 77.

The motor brake is released and the motor is set in operation when the switch comprising the contacts 82 and 84 is closed, as will appear from Fig. 2, and simultaneously the pinion gear 50 is released for rotation about its axis 51 and caused to undergo such rotation by the operation of the motor, clockwise as seen on Fig. 1. This causes the frame 76 and motor casing to swing rearwardly from the position shown on Fig. 7 toward that shown on Fig. 8, in fixed relation to each other, and this rearward swing continues as long as the pilot keeps moving the stick forwardly. A conventional stop means (not shown) which limits the movement of conventional sticks can be used, to prevent overrunning of the parts. When the pilot holds the stick in a forward position, the pinion 50 continues to rotate because the circuit is closed between the contacts 82 and 84, but the lug 47 remains stationary because the stick 62 remains stationary. This straightens out the very small angle 111 seen on Fig. 7 and 8, between the frame 76 and the motor casing, with the lug 47 remaining stationary so that both frame and motor casing are on a straight line as shown in Fig. 6 but with such line disposed angularly with relation to the segment 52 so that it will occupy a position somewhat like that of the line 112 of Fig. 8. The electrical switch contact 82 is thereby moved away from the contact 84, which de-energizes the switch solenoid, the switch automatically opens the motor and brake opening circuits, and the motor becomes locked in fixed position and remains locked and stationary as long as the stick remains stationary. This of course occurs only after the motor has in effect caught up with the stick by its own action of eliminating its angular deflection with relation to the arm 76. It will be seen that for every position of the deflectable surface there is a corresponding position or a short range of positions for the motor casing 46 and the lug 47, as well as for the stick 16.

Under all phases of operation, the hinge moment of the control surface 12 due to the wind effect thereon, and the muscular effort of the pilot to hold the stick stationary in its advanced position, will counteract and neutralize each other. Such effort of the pilot requires but a predetermined fraction of the force of such hinge moment, due to the leverage ratio involved. Both forces are applied to a lever arm pivoted on the axis 77, that of the wind effect being applied to the lever at the point 45 (the pin), and that of the pilot being applied to such lever arm at the point 47 (the lug), which is at a greater distance than the pin from the pivot point. By proper proportioning of these distances, the pilot can be made to counterbalance and thus "feel" any desired proportion of the total load.

There will accordingly be a feel back to the pilot of a load which is a predetermined constant proportion or fraction of the load which ordinarily has to be overcome, both while advancing the stick and while holding it stationary.

On releasing the stick completely, the tendency of the control surface to straighten out, due to the wind effect on it, will exert a rearward pull on the cable 35 and a forward pull on the cable 44. With the motor in locked condition, the motor casing will swing forwardly about the bolts 77 to close the switch comprising the contacts 81 and 83 which closes the circuit which causes the motor to rotate the pinion 50 or a predetermined series of pinions in a counterclockwise direction and thereby the motor casing and the frame 76 move forwardly to their normal location at an angle the reverse of that shown at 111 on Fig. 7, where they straighten out to the position shown on Fig. 6. In other words, the direction of rotation of the predetermined number of pinions or of one pinion in combination with the direction of motor rotation is such that the torque applied by the motor casing assists the operator in moving the control surfaces. On such return movement the load on the motor is, of course, very small because there is no counteracting force with the stick completely free. If the pilot releases the stick only partially, still applying some forward force to it but less than that required to hold it stationary, for example, for the purpose of slowing the return of the stick and control surface to their normal positions, the same functioning will occur as last described but with an increase of load on the motor equal to the effect of the force used to slow down the return.

The control surface 12 can be swung upwardly from its normal position as shown on Fig. 1 by pulling the stick to the rear, as seen on such figure, which makes a connection between the contacts 81 and 83. The operation will be similar in all respects but reversely to that previously described.

If the electric circuit becomes inoperative through damage to its parts, the latch lever is released manually, and the position of the control surface 12 can then be controlled by the stick 62. Tilting such stick in either direction will tilt the gear segment 52 on its shaft 53. The motor casing will swing in fixed relation to the segment and cause a corresponding deflection of the surface 12. On release of the stick by the pilot, the control surface is automatically returned to its normal position by the wind pressure on the surface, and such return of the surface automatically returns the stick.

By means of this invention, the pilot using a single control means, the control stick 16 will have the desired feel back in an amount which is a constant predetermined proportion of the hinge moment of the deflectable control surface. This proportion can be chosen, by properly designing the ratio of leverages, to be the most satisfactory. With the angles of pivoting about the pivot points 77 and 53 very small, there will be no substantial departure from the true proportion chosen. The pilot thus has the needed indicative feel back at all stages of the operation, no matter whether the servo motor is in operation or inoperative. If the electrical devices be damaged the pilot can prevent disaster on making the auxiliary control operative by releasing the latch lever 71 and using the auxiliary control 62 in conjunction with the control 16 to govern the craft, since the motor and pinion 50 will then be in locked condition and will form an inflexible lever member with the gear segment 52. If desired, the two control means can be connected together so that operation of one lever operates both means.

The control surface 12 is representative of any deflectable surface for controlling the attitude or course of aircraft whether it be a vertical or horizontal rudder or stabilizer at the rear end of the fuselage, an aileron on a wing, or any control surface at any other part of the aircraft. A plurality of such control surfaces are conventionally on each aircraft, and in the application of this invention there can be separate means involving the principles of this invention for as many of the control surfaces as may be found desirable.

Certain details have been referred to and illustrated merely for the purpose of explaining the invention without limiting it, and may be varied within the scope of the appended claims without departing from the spirit of the invention.

What is claimed is:

1. Craft control apparatus having a deflectable control surface, movable control means, a pivotally mounted support, an electric motor pivotally mounted on said support, selective switch contacts carried by said support and said motor, a pinion carried and to be driven by said motor, a normally fixed gear segment meshing with said pinion, means to operatively connect said control surface to said motor at a point spaced from its pivotal connections to said support, means for transmitting load feel to said control means operatively connecting said control means to said motor at a point spaced further from its pivotal connection to said support than said first mentioned point, and an electric circuit including said selective switch contacts to cause rotation of said motor in a direction dependent on the direction of movement of said control means.

2. Craft control apparatus having a deflectable control surface, movable control means, a pivotally mounted support, an electric motor pivotally mounted on said support, selective switch contacts carried by said support and said motor, a pinion carried and to be driven by said motor, a normally fixed gear segment meshing with said pinion, means to operatively connect said control surface to said motor at a point spaced from its pivotal connection to said support, means for transmitting load feel to said control means and controlling the operation of said motor, said last-mentioned means operatively connecting said control means to said motor at a point spaced further from its pivotal connection to said support than said first mentioned point, a brake operative to prevent said motor from revolving when said motor is not energized, and an electric circuit including said selective switch contacts to energize said motor to cause revolution thereof in a direction dependent on the direction of movement of said control means and to cause said brake to be inoperative while said motor is energized.

3. Craft control apparatus having a deflectable control surface, movable control means, a pivotally mounted support, an electric motor pivotally mounted on said support, selective switch contacts carried by said support and said motor, a pinion carried and to be driven by said motor, a gear segment pivotally mounted intermediate its ends meshing with said pinion, means to operatively connect said control surface to said motor at a point spaced from its pivotal connection to said support, means for transmitting load feel to said control means and selectively controlling the operation of said motor, said last-mentioned means operatively connecting said control means to said motor at a point spaced further from its pivotal connection to said support than said first mentioned point, a brake operative to prevent said motor from revolving when said motor is not energized, an electric circuit including said selective switch contacts to energize said motor to cause revolution thereof in a direction dependent on the direction of movement of said control means and to cause said brake to be inoperative while said motor is energized, an auxiliary movable control means, means to connect said auxiliary control means to said gear segment at points opposite its pivotal mounting, and unlockable means to lock said auxiliary control means in fixed position to hold said gear segment in fixed position during normal operation.

4. Craft control apparatus comprising a control surface, manual control means for said surface, a plurality of levers and linkages connecting said manual control means to said control surface including a primary lever, a normally fixed gear segment about which said primary lever is adapted to move, upon the application of a predetermined amount of force to said lever by said control means, electro-mechanical means for augmenting the force placed upon said primary lever by said control means to thereby cause movement of said lever about said gear segment, the direction of movement of said primary lever about said gear segment being dependent upon that of said control means, and means for locking said gear segment in a fixed position including an auxiliary control member.

5. Craft control apparatus comprising a control surface, manual control means for said surface, a plurality of levers and linkages connecting said manual control means to said surface including a primary lever, non-resilient electrical and mechanical means for augmenting the actuation of said primary lever by said control means, the direction of movement of said primary lever being dependent upon that of said control means and auxiliary control means in combination with said mechanical means for augmenting actuation of said primary lever upon failure of said electrical means.

6. Craft control apparatus comprising a control surface, manual control means for said surface, a plurality of levers and linkages connecting said control means to said control surface including a primary lever, non-resilient electrical means including an electric motor in combination with mechanical means for augmenting the actuation of said primary lever by said control means, the direction of said primary lever being dependent upon that of said control means, an auxiliary control means in combination with said mechanical means for augmenting the actuation of said primary lever upon failure of said electrical means and means for retarding said electrical motor when said electrical motor is inoperative.

7. Craft control apparatus comprising a control surface, manual control means for said surface, a plurality of levers and linkages connecting said control means to said control surface including a primary lever, a normally fixed gear segment about which said primary lever is adapted to move, upon the application of a predetermined amount of force to said lever by said control means, electrical means including an electric motor in combination with mechanical means for augmenting the force placed upon said primary lever by said control means to thereby cause movement of said lever about said gear segment, the direction of movement of said primary lever about said gear segment being dependent upon that of said control means, means for retarding said electrical motor when said electrical motor is inoperative and means for locking said gear segment in a fixed position including an auxiliary control member.

8. Craft control apparatus comprising a movable control surface, movable control means, a normally fixed gear segment, an arm pivotally connected to said gear segment, a casing housing an electric motor and pivotally connected to said arm, non-resilient selective switch contacts carried by said arm and said motor casing, a pinion carried and driven by said motor and meshing with said gear segment, means operatively connecting said control surface to said motor casing, means operatively connecting said motor casing to said movable control means and an electric circuit including said selective switch contacts for energizing said motor to cause rotation thereof in a direction dependent upon the direction of movement of said control means.

9. Craft control apparatus comprising a movable control surface, movable control means, a normally fixed gear segment, an arm pivotally connected to said gear segment, a casing housing an electric motor and pivotally connected to said arm, non-resilient selective switch contacts carried by said arm and said motor casing, a pinion carried and driven by said motor and meshing with said gear segment, means operatively connecting said control surface to said motor casing, means operatively connecting said motor casing to said movable control means, an electric circuit including said selective switch contacts for energizing said motor to cause rotation thereof in a direction dependent upon the direction of movement of said control means, and braking means for said motor inoperative when said motor is energized.

10. Craft control apparatus comprising a movable control surface, movable control means, a normally fixed gear segment, an arm pivotally connected to said gear segment, a casing housing an electric motor and pivotally connected to said arm, non-resilient selective switch contacts carried by said arm and said motor casing, a pinion carried and driven by said motor and meshing with said gear segment, means operatively connecting said control surface to said motor casing, means operatively connecting said motor casing to said movable control means, an electric circuit including said selective switch contacts for energizing said motor to cause rotation thereof in a direction dependent upon the direction of movement of said control means, means for retarding said motor when said motor is inoperative and an auxiliary means for moving said gear segment upon failure of said electric motor.

11. Craft control apparatus comprising in combination a deflectable control surface and control means for said control surface including a normally immovable member, a primary lever pivotally affixed to said normally immovable member, an electric motor fixed to said lever, mechanical means connecting said motor to said normally immovable member, non-resilient selective switch contacts on said normally immovable member and said lever, an electric circuit connecting said motor and switch contacts, linkage means connecting said control surface to said lever, and a second linkage means connecting said lever to said control means whereby upon a predetermined amount of movement of said control means said motor will be energized by means of said selective switch contacts and said circuit thereby causing said lever to pivot further about said normally immovable member, in a direction dependent upon movement of said control means.

12. Craft control apparatus comprising in combination a deflectable control surface, control means for said control surface, a normally immovable member, a primary lever pivotally affixed to said normally immovable member, an electric motor fixed to said lever, mechanical non-resilient selective switch contacts on said normally immovable member and said lever, an electric circuit connecting said motor with said switch contacts, linkage means connecting said control surface to said lever, a second linkage means connecting said lever to said control means whereby upon a predetermined amount of movement of said control means said motor will be energized by means of said selective switch contacts and said circuit thereby causing said lever to pivot further about said normally immovable member, and braking means for said motor inoperative when said motor is energized.

13. Craft control apparatus comprising in combination a deflectable control surface, control means for said control surface, a normally immovable member, a primary lever pivotally affixed to said normally immovable member, an electric motor fixed to said lever, means connecting said motor to said normally immovable member, non-resilient selective switch contacts on said normally immovable member and said lever, an electric circuit connecting said motor with said switch contacts, linkage means connecting said control surface to said lever, a second linkage means connecting said lever to said control means whereby upon a predetermined amount of movement of said control means said motor will be energized by means of said selective switch contacts and said circuit thereby causing said lever to pivot further about said normally movable member, auxiliary means for moving said normally immovable member upon failure of said motor and braking means for retarding said motor when said motor is inoperative.

14. Craft control apparatus having a deflectable control surface, movable control means, a pivotally mounted support, an electric motor pivotally mounted on said support, selective switch contacts carried by said support and said motor, a pinion carried and driven by said motor, a normally fixed gear segment meshing with said pinion, means to operatively connect said control surface to said motor at a point spaced from its pivotal connections to said support, means for transmitting load feel to said control means operatively connecting said control means to said motor at a point spaced further from its pivotal connection to said support than said first mentioned point, an electric circuit including said selective switch contacts to cause rotation of said motor in a direction dependent on the direction of movement of said control means, and auxiliary control means including an auxiliary control stick connectable to said deflectable control surface upon failure of said motor.

15. Craft control apparatus as claimed in claim 14, wherein the auxiliary control means includes a brake operative to prevent said motor from revolving when said motor is not energized.

16. Craft control apparatus as claimed in claim 14 including means to lock said auxiliary control stick in a rigid position whereby said gear segment is held in fixed position during normal operation.

GEORGE B. SCHEER.

REFERENCES CITED

The following references are of record in the file of this patent:

UNITED STATES PATENTS

| Number | Name | Date |
|---|---|---|
| 1,134,739 | Handy | Apr. 6, 1915 |
| 1,304,870 | Gale | May 27, 1919 |
| 1,377,306 | Brush | May 10, 1921 |
| 1,702,184 | Uwins | Feb. 12, 1929 |
| 1,759,442 | Depew, Jr. | May 20, 1930 |
| 2,277,378 | Wells | Mar. 24, 1942 |
| 2,330,569 | Esnault-Pelterie | Sept. 28, 1943 |
| 2,360,542 | Berry | Oct. 17, 1944 |
| 2,366,382 | Burton et al. | Jan. 2, 1945 |

FOREIGN PATENTS

| Number | Country | Date |
|---|---|---|
| 130,213 | Great Britain | July 31, 1919 |